(12) United States Patent
Ryu et al.

(10) Patent No.: US 9,192,904 B1
(45) Date of Patent: Nov. 24, 2015

(54) FLUIDIZED BED REACTOR HAVING SCREW CONVEYOR AND FLUIDIZED BED SOLID CIRCULATION SYSTEM USING THE SAME

(71) Applicant: Korea Institute of Energy Research, Daejeon (KR)

(72) Inventors: Ho-jung Ryu, Daejeon (KR); Dong-ho Lee, Daejeon (KR); Gyoung-tae Jin, Daejeon (KR); Do-won Shun, Daejeon (KR); Chang-keun Yi, Daejeon (KR); Jae-hyeon Park, Daejeon (KR); Dal-hee Bae, Sejong (KR); Sung-ho Jo, Daejeon (KR); Seung-yong Lee, Daejeon (KR); YoungCheol Park, Daejeon (KR); Jong-ho Moon, Seoul (KR); Ji-bong Joo, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 14/540,809

(22) Filed: Nov. 13, 2014

(30) Foreign Application Priority Data

Aug. 18, 2014 (KR) .......................... 10-2014-0106973

(51) Int. Cl.
*B01J 8/18* (2006.01)
*B01J 8/24* (2006.01)
*B01J 8/38* (2006.01)

(52) U.S. Cl.
CPC ...... *B01J 8/1872* (2013.01); *B01J 2208/00761* (2013.01)

(58) Field of Classification Search
CPC .......... B01J 8/18; B01J 8/1845; B01J 8/1863; B01J 8/1872; B01J 8/24; B01J 8/38–8/386; B01J 2208/00743; B01J 2208/00761; B01J 2208/00796; B01J 2208/00823; B01J 2208/00858; B01J 2208/00867
See application file for complete search history.

(56) References Cited

U.S. PATENT DOCUMENTS

| | | | | |
|---|---|---|---|---|
| 3,003,641 | A * | 10/1961 | Laughlin ................ | B01D 15/02 210/189 |
| 4,823,712 | A | 4/1989 | Wormer ........................ | 110/245 |
| 5,899,566 | A * | 5/1999 | Zingel ........................ | B01F 3/12 366/266 |
| 8,292,977 | B2 * | 10/2012 | Suda ........................ | C10J 3/482 110/230 |
| 2007/0144413 | A1 | 6/2007 | Miyoshi et al. ................ | 110/243 |

* cited by examiner

*Primary Examiner* — Natasha Young
(74) *Attorney, Agent, or Firm* — Harness, Dickey & Pierce, P.L.C.

(57) ABSTRACT

A fluidized bed reactor is provided. The fluidized bed reactor includes a screw conveyor configured to penetrate through an upper portion of the fluidized bed reactor and to discharge solid particles to an outside from the fluidized bed reactor. The screw conveyor is configured to have an upper end protrude from the upper portion of the fluidized bed reactor and a lower end located at a height equal to or higher than a height of a distributor of the fluidized bed reactor.

10 Claims, 8 Drawing Sheets

FLUIDIZED BED REACTOR HAVING SCREW CONVEYOR AND FLUIDIZED BED SOLID CIRCULATION SYSTEM USING THE SAME

CROSS-REFERENCE TO RELATED PATENT APPLICATION

This application claims priority from Korean Patent Application No. 2014-0106973, filed on Aug. 18, 2014 in the Korean Intellectual Property Office, the disclosure of which is incorporated herein by reference in its entirety.

FIELD

Apparatuses and methods consistent with the exemplary embodiments relate to a fluidized bed reactor, and more particularly, to a fluidized bed reactor having a screw conveyor and a fluidized bed solid circulation system using the same.

BACKGROUND

A fluidized bed reactor is a device that injects solid particles therein and injects gas through a plenum and a gas distributor located on a lower portion of the reactor, and changes behavior of the solid particles to be similar that of fluids by making the solid particles float.

Due to improved solid mixing and mass and heat transfer characteristics in comparison with other reactors, a fluidized bed process using such a fluidized bed reactor is widely used in: physical process such as drying, adsorption, cooling, freezing, coating, moving, heat control, filtering, temperature control, etc.; a chemical reaction occurring by a catalytic reaction such as fluid catalytic cracking (FCC), oxychlorination, phthalic anhydride production, polymerization, etc.; a non-catalytic reaction such as coal combustion, coal gasification, calcinations, mineral roasting, waste incineration, etc., and an energy conversion processes.

In the case of a process in which two reactions occur simultaneously, such as a carbon dioxide absorption and regeneration process using a dry regenerable sorbent, an oxidation-reduction process of a chemical-looping combustor, a Fisher-Tropsch process, a sorption enhanced steam methane reforming of natural gas, a chemical-looping hydrogen generation process, etc., two fluidized bed reactors are used and solid conveyance and circulation are required between the two fluidized bed reactors.

Figure 1A:
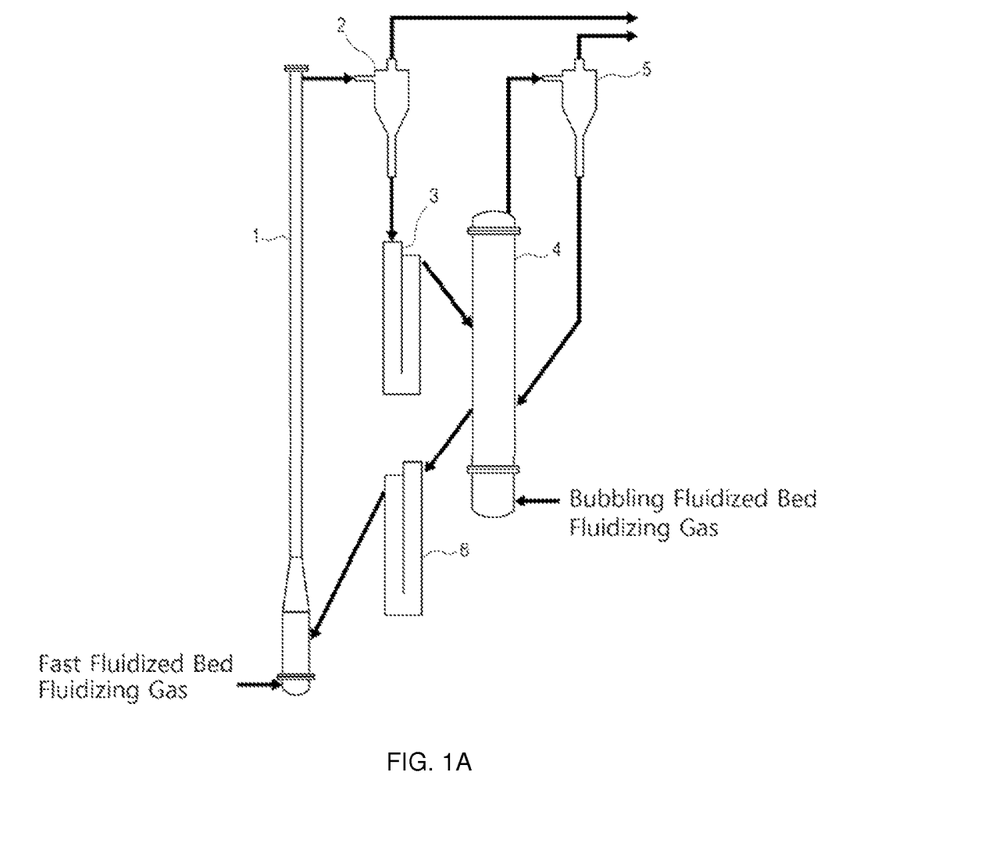
FIGS. 1A and 1B are views to illustrate a related-art fluidized bed solid circulation system.
Figure 1B:
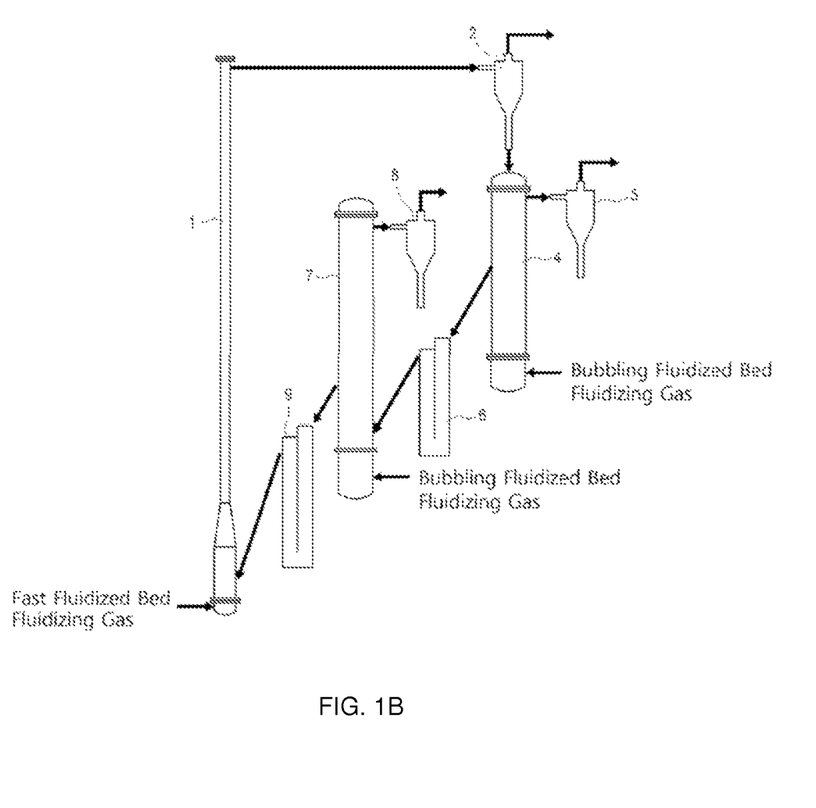

As a related-art method used for solid circulation between the two fluidized bed reactors, a fluidized bed solid circulation system shown in FIG. 1A or FIG. 1B is used. FIG. 1A illustrates a solid circulation system including a fast fluidized bed 1 and a bubbling fluidized bed 4, and FIG. 1B illustrates a solid circulation system including a fast fluidized bed 1, a first bubbling fluidized bed 4, and a second bubbling fluidized bed 7.

In the system of FIG. 1A, the fast fluidized bed 1 may be used for both reaction and solid conveyance. A first reaction of two reactions that has a lower reaction rate is performed in the bubbling fluidized bed 4, and the fast fluidized bed 1 is used for another reaction and solid circulation. However, when the reaction rate of the two reactions is low or a sufficient residence time is required, or when there is a limit to a ratio of a gas flow, the two reactions are performed in the first and second bubbling fluidized beds 4 and 7 in which a gas velocity is low, and the fast fluidized bed 1 is additionally used only for solid conveyance as shown in FIG. 1B.

However, when the fast fluidized bed is used as described above, additional gas is required to move up solids by using the fast fluidized bed, and inert (e.g., nitrogen, argon, helium, etc.) should be injected or a steam should be used to facilitate separation from the gas discharged by the reactions. In particular, when the two reactions occur at high temperature and high pressure, gas having high temperature and high pressure should be injected. Therefore, a cost for pre-heating and pressurizing may be additionally incurred. In addition, the gas velocity of the fast fluidized bed should increase to increase the amount of circulated solid, and thus the cost for gas increases further. In addition, when the height over which the solids should go is high, much gas is required.

SUMMARY

One or more aspects of the exemplary embodiments provide a fluidized bed reactor which does not require additional gas to convey solids or can reduce use of gas, and a fluidized bed solid circulation system using the same.

One or more aspects of the exemplary embodiments also provide a fluidized bed reactor which can convey solid particles without a limit to height in circulating the solid particles, and a fluidized bed solid circulation system using the same.

One or more aspects of the exemplary embodiments also provide a fluidized bed reactor which can perform reactions and solid conveyance simultaneously, thereby being reduced in volume, and a fluidized bed solid circulation system using the same.

According to an aspect of an exemplary embodiment, there is provided a fluidized bed reactor including a screw conveyor configured to penetrate through an upper portion of the fluidized bed reactor and to discharge solid particles to an outside from the fluidized bed reactor, wherein the screw conveyor is configured to have an upper end protrude from the upper portion of the fluidized bed reactor and a lower end located at a height equal to or higher than a height of a distributor of the fluidized bed reactor.

According to an aspect of an exemplary embodiment, there is provided a fluidized bed solid circulation system including: a first fluidized bed reactor comprising a first screw conveyor configured to penetrate through an upper portion of the first fluidized bed reactor and to discharge solid particles to an outside from the first fluidized bed reactor; a second fluidized bed reactor configured to receive solid particles discharged from the first screw conveyor of the first fluidized bed reactor; and a connection pipe configured to connect the first and second fluidized bed reactors to each other to allow solid particles discharged from the second fluidized bed reactor to the first fluidized bed reactor, wherein the first screw conveyor is configured to have an upper end protrude from the upper portion of the first fluidized bed reactor and a lower end located at a height equal to or higher than a height of a distributor of the first fluidized bed reactor.

According to one or more exemplary embodiments, a fluidized bed reactor includes a screw conveyor, so that additional gas for conveying solids is not required and thus an amount of gas used in a solid circulation system can be greatly reduced.

According to one or more exemplary embodiments, by connecting a multi-stage screw conveyor to a fluidized bed reactor including a screw conveyor, solid particles can be conveyed and circulated without limitation of height.

According to one or more exemplary embodiments, since a fluidized bed reactor including a screw conveyor performs reactions and solid conveyance simultaneously, a volume of the fluidized bed reactor can be reduced.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that when an element is referred to as being "on" (or "under", "on the right of", or "on the left of") another element, the element can be directly on (or "under", "on the right of", or "on the left of") another element or intervening elements. In the drawings, thicknesses of elements are exaggerated for easy understanding of technical features.

The expressions such as "upper (top)", "lower (bottom)", "left", "right", "front", "rear", etc. used in the specification to explain a location relationship between elements do not mean a directions or location as an absolute criterion and are relative expressions used for convenience of explanation with reference to a corresponding drawing when the present invention is explained with reference to each drawing.

If the terms such as 'first' and 'second' are used to describe elements, these element should not be limited by such terms. These terms are used for the purpose of distinguishing one element from another element only. The exemplary embodiments include their complementary embodiments.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Figure 2:
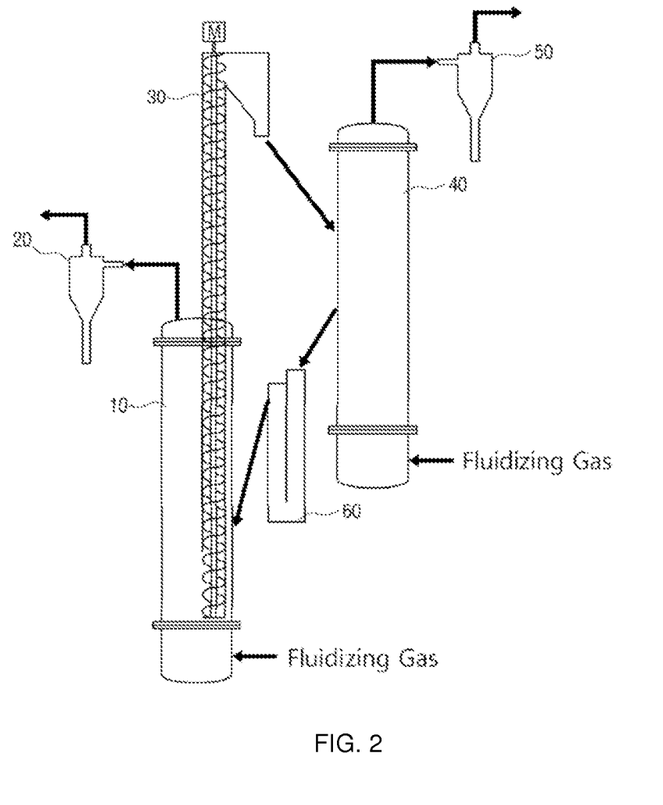
FIG. 2 is a view to illustrate a fluidized bed solid circulation system according to an exemplary embodiment.

FIG. 2 is a view to illustrate a fluidized bed solid circulation system according to an exemplary embodiment.

Referring to FIG. 2, the fluidized bed solid circulation system according to an exemplary embodiment includes a first fluidized bed reactor 10 and a second fluidized bed reactor 40, a first cyclone 20 and a second cyclone 50, and a loop seal 60.

In this solid circulation system, the first fluidized bed reactor 10 includes a screw conveyor 30. The screw conveyor 30 is placed to penetrate through an upper portion of the first fluidized bed reactor 10, so that a part of the screw conveyor 30 is located in the first fluidized bed rector 10 and the other part of the screw conveyor 30 extends and protrudes from the upper portion of the first fluidized bed reactor 10. The first cyclone 20 receives gas and solid particles discharged from an outlet of the first fluidized bed reactor 10 and separates the gas and the solid particles from each other.

The second fluidized bed rector 40 receives solid particles discharged from the first fluidized bed reactor 10. Specifically, the second fluidized bed reactor 40 may receive solid particles discharged to the outside through the screw conveyor 30 extending to the outside from the upper portion of the first fluidized bed reactor 10. The second cyclone 50 receives gas and solid particles discharged from an outlet of the second fluidized bed reactor 40 and separates the gas and the solid particles from each other.

The solid circulation system shown in FIG. 2 further includes a connection pipe connected between the first and second fluidized bed reactors 10 and 40 to convey the solid particles discharged from the second fluidized bed reactor 40 to the first fluidized bed reactor 10. As shown in FIG. 2, the loop seal 60 may be interposed between these connection pipes.

According to such a system configuration, solid particles discharged from the second fluidized bed reactor 40 are recycled to the first fluidized bed reactor 10 through the loop seal 60, and solid particles in the first fluidized bed reactor 10 move up through the screw conveyor 30 and are discharged to the outside of the first fluidized bed reactor 10, and move to the second fluidized bed reactor 40. In this way, the solid particles are re-circulated.

In this case, in the illustrated system, a bubbling fluidized bed may be formed in each of the first and second fluidized bed reactors 10 and 40. However, in each of the first and second fluidized bed reactors 10 and 40, a fluidized bed of various phases such as a turbulent fluidized bed, a fast fluidized bed, etc., may be formed according to an exemplary embodiment, and it should be understood that the present invention is not limited to a fluidized bed reactor having a specific phase therein.

Figure 3:
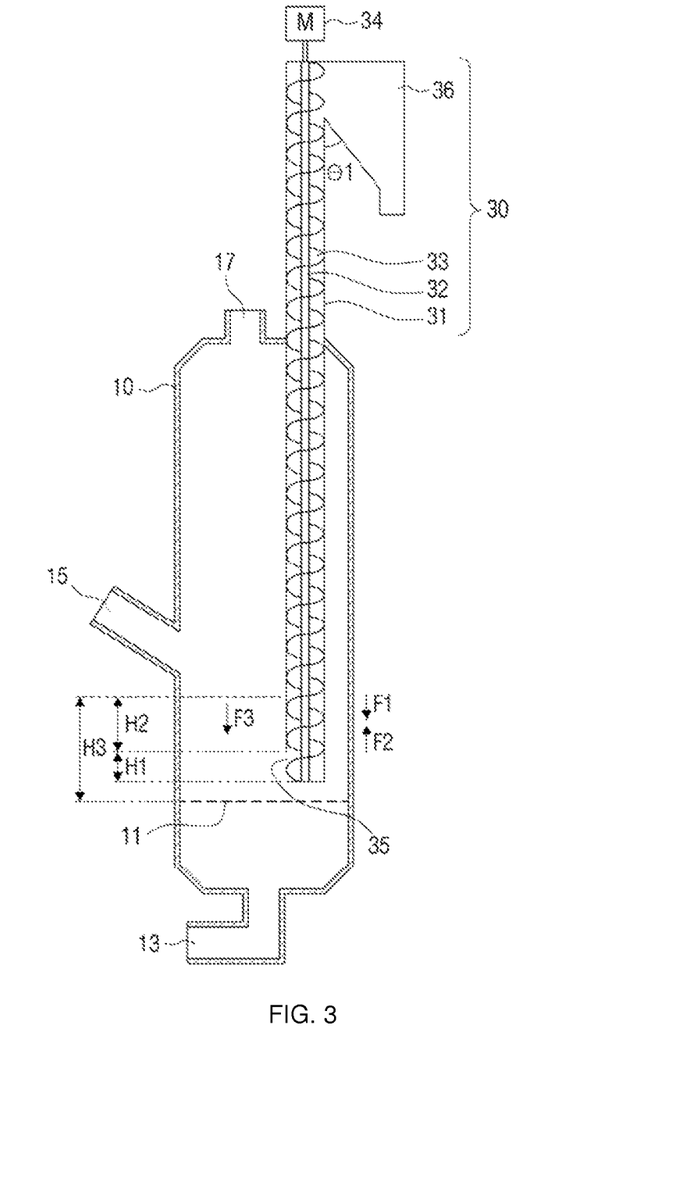
FIG. 3 is a view to illustrate a fluidized bed rector according to an exemplary embodiment.

FIG. 3 is a view schematically illustrating a cross section of a fluidized bed reactor including a screw conveyor according to an exemplary embodiment.

Referring to FIG. 3, the fluidized bed reactor 10 may include an inlet 13 through which fluidizing gas is injected, an inflow pipe 15 through which solid particles are conveyed, and a discharge pipe 17 through which a reaction product such as gas, etc. is discharged.

The inlet 13 through which the fluidizing gas is injected may be formed on a bottom surface or a side surface of a lower end of the fluidized bed reactor 1. The fluidized bed reactor 10 includes a distributor 11 which is formed above the inlet 13 at a predetermined distance from the inlet 13 in the fluidized bed reactor 10 and traverses the fluidized bed reactor 10. The fluidizing gas injected through the inlet 13 is distributed in the fluidized bed reactor 10 by the distributor 11 and is supplied to the upper portion.

Although the cross section of the fluidized bed reactor 10 of a specific configuration is illustrated in the drawing, this is an example and is a schematic cross section view, and the number, location, and configuration of the distributor 11, the inlet 13, the inflow pipe 15, and the discharge pipe 17 may vary according to an exemplary embodiment.

According to an exemplary embodiment, the fluidized bed reactor 10 further includes a screw conveyor 30 to discharge solid particles to the outside of the fluidized bed reactor 10. In the illustrated embodiment, the screw conveyor 30 is placed to penetrate through an upper portion of the fluidized bed reactor 10. That is, an upper end of the screw conveyor 30 protrudes from the upper portion of the fluidized bed reactor 10 and a lower end of the screw conveyor 30 is located in the fluidized bed reactor 10. Although the screw conveyor 30 vertically penetrates in the drawing, the screw conveyor 30 may be configured to have a slight inclination angle in an alternative exemplary embodiment.

In the illustrated embodiment, the screw conveyor 30 may include a conveyance pipe 31, a driving shaft 32, a screw blade 33, and a driving motor 34. The conveyance pipe 31 is an element corresponding to a body of the screw conveyor 30, and has a cylindrical shape and is placed to penetrate through the upper portion of the fluidized bed reactor 10. That is, an upper end of the conveyance pipe 31 penetrates through the upper portion of the fluidized bed reactor 10 and vertically protrudes, and a lower end of the conveyance pipe 31 is located in the fluidized bed reactor 10. In this case, the lower end of the screw conveyor 30 may be located at a height substantially equal to or higher than that of the distributor 11 in the fluidized bed reactor 10.

The driving shaft 32 extends from the upper end to the lower end in the conveyance pipe 31, and opposite ends of the driving shaft 32 are supported by a shaft support and are configured to prevent gas in the fluidized bed reactor 10 from leaking to the outside by sealing (mechanical seal, etc.). The screw blade 33 is mounted around a circumference of the driving shaft 32 and the driving shaft 32 and the screw blade 33 are rotatable by the driving motor 34 disposed at the upper or lower portion of the conveyance pipe 31.

In the illustrated embodiment, the screw conveyor 30 may further include a solid inlet 35 formed on a side surface of the lower end of the conveyance pipe 31, and a solid outlet 36 formed on a side surface of the upper end of the conveyance pipe 31. The solid inlet 35 may be immersed in fluidized solids in the fluidized bed reactor 10. That is, a height of the solid inlet 35 may be lower than a height of solid particles contained in the fluidized bed reactor 10.

The solid outlet 36 is formed by opening a part of the side surface of the upper portion of the conveyance pipe 31. Solid particles conveyed to the upper portion by rotation of the screw blade 33 fall down by gravity and are discharge through the solid outlet 36. In this case, an inclination angle θ1 of the solid outlet 36 is formed considering a repose angle of solid particles according to a kind of solid particles so that the solid particles can be prevented from being piled.

It is assumed that a force by which solid particles in the conveyance pipe 31 descend along the screw blade 33 and a wall of the conveyance pipe 31 due to their self-weight is F1, a force by which solid particles in the conveyance pipe 31 ascend due to rotation of the screw blade 33 is F2, and a force by which solid particles in the conveyance pipe 31 ascend due to a pressure of solid particles contained in the fluidized bed reactor 10 is F3. When (F2+F3)>F1, an ascending movement of solid particles through the screw conveyor 30 may occur. Accordingly, to satisfy this condition, a rotation speed of the driving motor 34 may be controlled and the solid particles are smoothly conveyed to the upper portion.

In addition, the above condition may be satisfied by increasing the pressure (F3) by the solid particles existing above the solid inlet 35 by increasing an overall height H3 of solid particles, or by reducing a height H1 of the solid inlet 35 and thus increasing a height H2 of solid particles above the solid inlet 35. Alternatively, the above condition may be satisfied by reducing F1 by reducing an overall height of the conveyance pipe 31 or reducing a clearance between the conveyance pipe 31 and the screw blade 33.

When we want to increase an overall height for conveying solid particles and only one screw conveyor 30 is used, F2 and F3 are constant, but the amount of solid particles existing in the conveyance pipe 31 increases due to the increment of the height of the conveyance pipe 31 and thus F1 increases. Therefore, the solid particles may not be conveyed. To solve this problem, a multi-stage screw conveyor may be provided as shown in FIG. 4.

Figure 4:
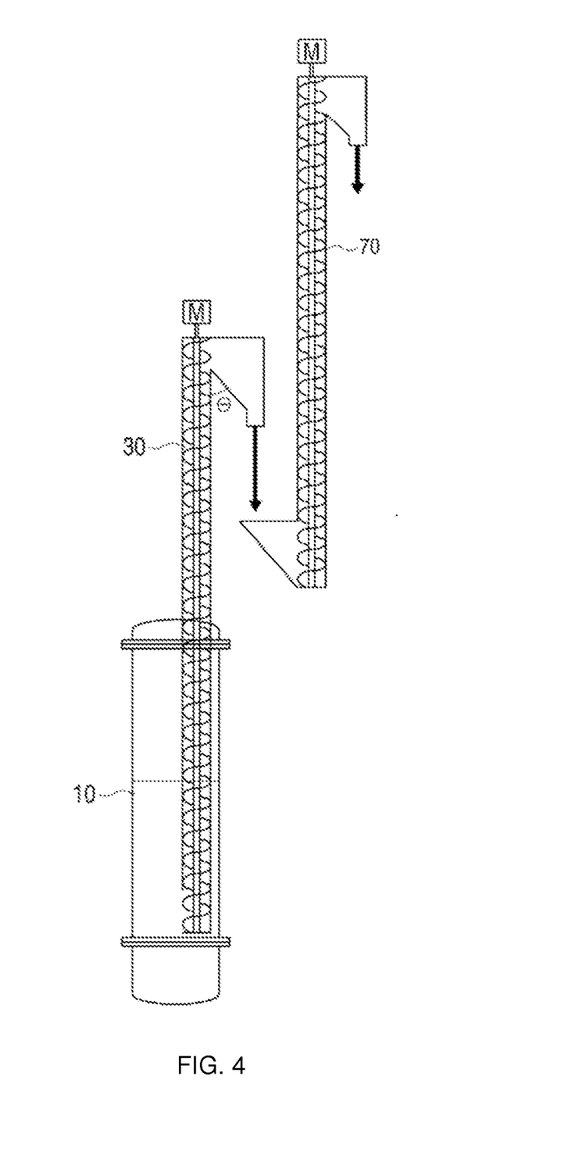
FIG. 4 is a view to illustrate a configuration of a multi-stage screw conveyor according to an exemplary embodiment.

FIG. 4 illustrates a configuration of a multi-stage screw conveyor according to an exemplary embodiment. In the illustrated embodiment, in addition to a first screw conveyor 30 integrally formed with the fluidized bed reactor 10, a second screw conveyor 70 of a vertical type is provided. Accordingly, solid particles conveyed from the first screw conveyor 30 can move up more than in the forgoing embodiment by the second screw conveyor 70 and thus the total solid conveyance height can increase without increasing F1.

Figure 5A:
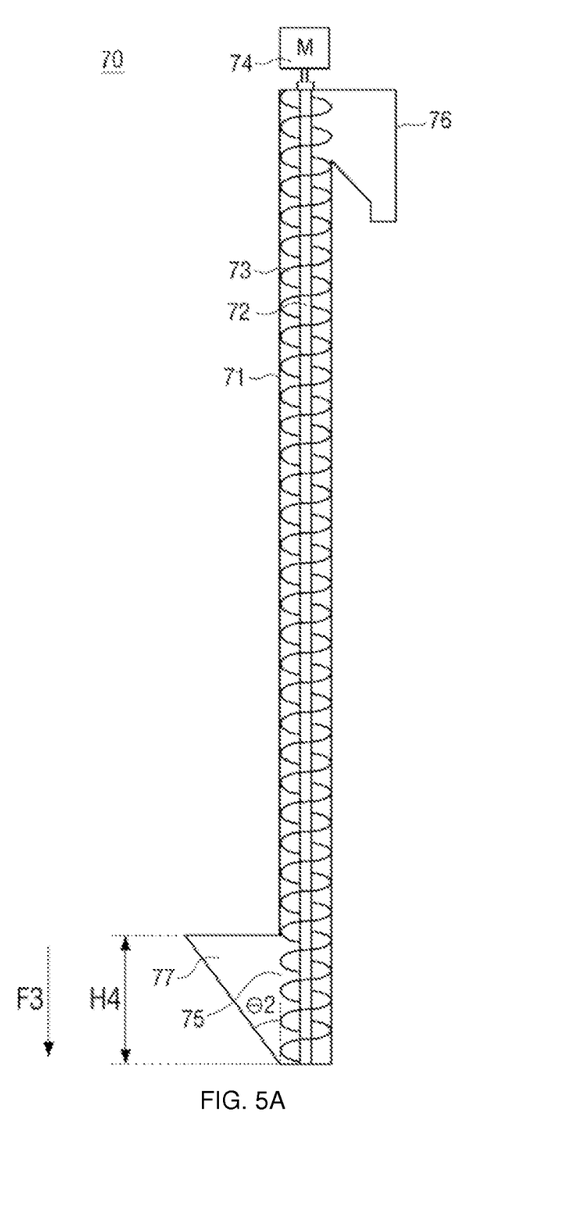
FIGS. 5A to 5C are views to illustrate a second screw conveyor according to various exemplary embodiments.
Figure 5B:
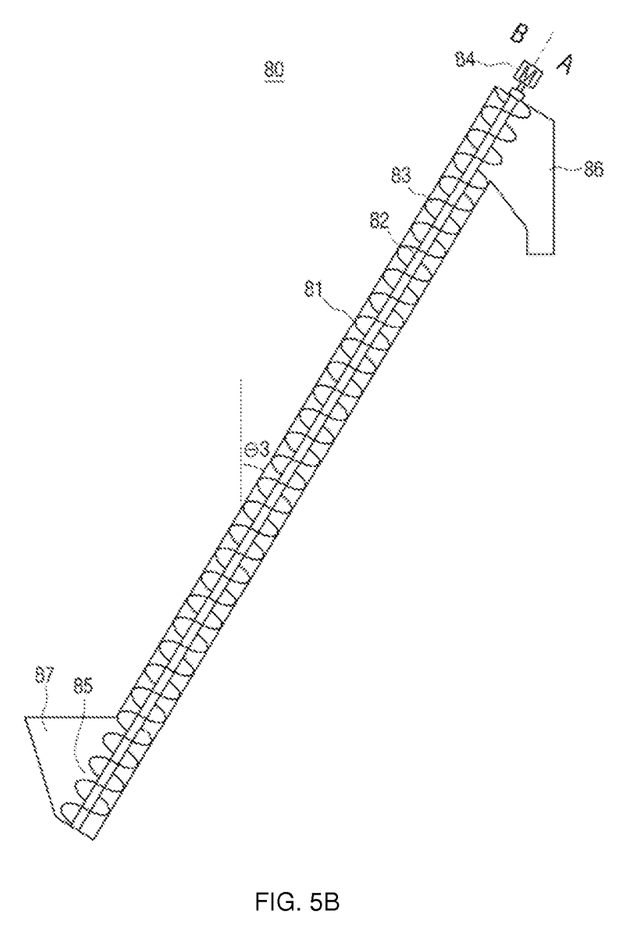
Figure 5C:
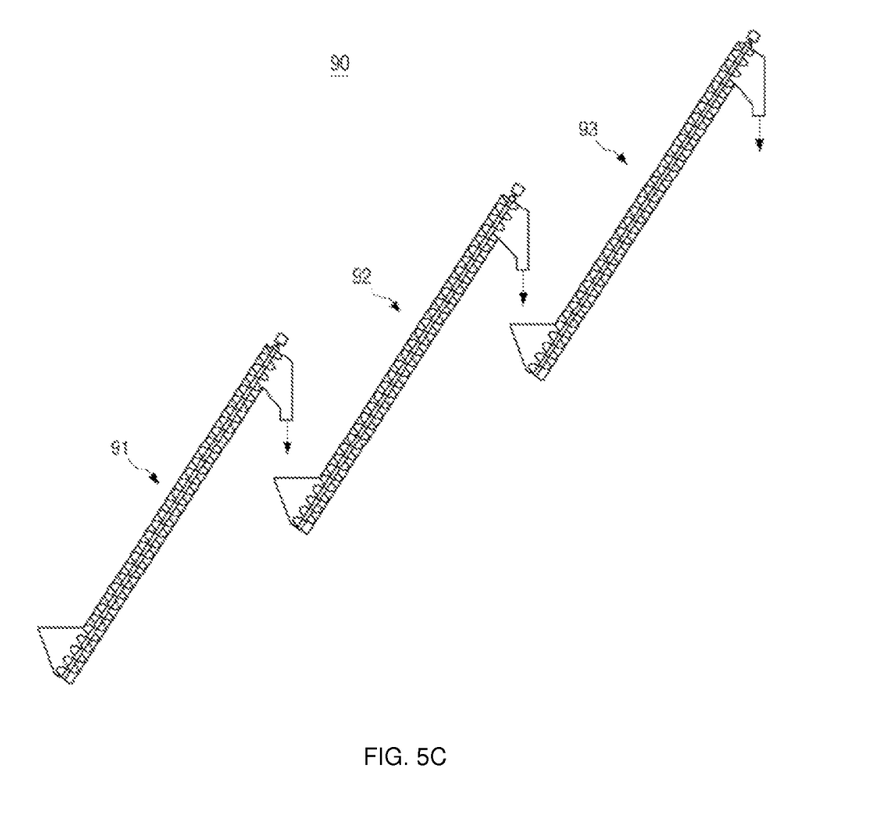

FIGS. 5A to 5C are views to illustrate a second screw conveyor according to various exemplary embodiments.

Referring to FIG. 5A, a vertical-type second screw conveyor 70 according to an exemplary embodiment is a conveyor which is installed in an upright position, and may include a conveyance pipe 71, a driving shaft 72, a screw blade 73, a driving motor 74, a solid inlet 75, and a solid outlet 76 similarly to the first screw conveyor 30. In addition, the second screw conveyor 70 may further include a solid storage 77 integrally formed with the solid inlet 75. The solid storage 77 is configured to allow solid particles to be piled in front of the solid inlet 75 prior to flowing into the conveyance pipe 71. In the case of the first screw conveyor 30, solid particles exist above the solid inlet 35 in the fluidized bed reactor 10 and thus there is the pressure (F3) due to the solid particles. However, in the case of the second screw conveyor 70, such a pressure (F3) is not be naturally generated. Therefore, in order to generate the force F3, the second screw conveyor 70 includes the solid storage 77 for allowing solid particles to be piled around the solid inlet as shown in FIG. 5A. Accordingly, the pressure (F3) can be obtained as much as a height H4 of the solid particles piled in the solid storage 77.

In this case, an inclination angle 82 of the solid storage 77 may be formed considering a repose angle of used solid particles to be able to apply an appropriate pressure (F3) by solid particles.

Referring to FIG. 5B, a second screw conveyor 80 of an inclined type according to an alternative exemplary embodiment is illustrated. This screw conveyor 80 differs from the vertical type screw conveyor 70 of FIG. 5A in that the conveyor is inclined, but include the same or similar elements. That is, the inclined type screw conveyor 80 may include a conveyance pipe 81, a driving shaft 82, a screw blade 83, a driving motor 84, a solid inlet 85, a solid outlet 86, and a solid storage 87. When the screw conveyor is inclined as described above, an inclination angle 83 of the screw conveyor increases and thus the force F1 by which the solid particles descend along the screw blade 83 and the wall of the conveyance pipe 81 is reduced, so that the capability to move up solid particle can be improved.

When the inclined type screw conveyor 80 is used, the solid inlet 85 should be formed on an upper portion with reference to the driving shaft 81 of the screw conveyor (B direction, that is, in a direction against gravity) to be able to continue to inject solids into the lower portion of the solid conveyance pipe. In addition, the solid outlet 86 should be formed on a lower portion with reference to the driving shaft 81 (A direction, that is, in the direction of gravity) to be able to continue to discharge the solids.

Referring to FIG. 5C, a second screw conveyor 90 according to another alternative exemplary embodiment includes a plurality of sub screw conveyors 91, 92, and 93 connected to one another in multi stages. Each of the sub screw conveyors 91, 92, and 93 may have a same or similar configuration as or to that of the inclined type screw conveyor 80 shown in FIG. 5B. For example, each of the plurality of sub screw conveyors 91, 92, and 93 in the illustrated exemplary embodiment includes a solid inlet formed at a lower end of the sub screw conveyor and a solid outlet formed at an upper end. In addition, the plurality of sub screw conveyors 91, 92, and 93 are arranged so that solid particles discharged from the solid outlet of one of the plurality of sub screw conveyors 91, 92, 93 (e.g., 91) flow into the solid inlet of another neighboring sub screw conveyor (e.g., 92). When the inclined type screw conveyors are used in multi stages as described above, the total solid conveyance height may increase further.

In addition, although the inclined type screw conveyors are connected in multi stages in FIG. 5C, the vertical type screw conveyors 70 shown in FIG. 5A may be connected in multi stages and used alternatively. In addition, the vertical screw conveyors 70 of FIG. 5A and the inclined type screw conveyors 80 of FIG. 5B may be connected in multi stages in combination with one another, and used.

While exemplary embodiments have been particularly shown and described above, it will be understood by those of ordinary skill in the art that various changes in form and details may be made therein without departing from the spirit and scope of the present invention as defined by the following claims.

What is claimed is:

1. A fluidized bed reactor comprising:
a screw conveyor configured to penetrate through an upper portion of the fluidized bed reactor and to discharge solid particles to an outside from the fluidized bed reactor,
wherein the screw conveyor is configured to have an upper end protrude from the upper portion of the fluidized bed reactor and a lower end located at a height equal to or higher than a height of a distributor of the fluidized bed reactor.

2. The fluidized bed reactor of claim 1, wherein the screw conveyor comprises:
a conveyance pipe configured to have a cylindrical shape and penetrate through the upper portion of the fluidized bed reactor;
a driving shaft configured to extend from an upper end to a lower end of the conveyance pipe in the conveyance pipe;
a screw blade mounted around the driving shaft; and
a driving motor configured to rotate the driving shaft.

3. The fluidized bed reactor of claim 2, wherein the screw conveyor comprises:
a solid inlet formed on a side surface of the lower end of the conveyance pipe; and
a solid outlet formed on a side surface of the upper end of the conveyance pipe.

4. The fluidized bed reactor of claim 3, wherein a height of the solid inlet is lower than a height of layers of solid particles contained in the fluidized bed reactor.

5. The fluidized bed reactor of claim 3, wherein a rotation speed of the driving shaft is controlled such that a sum of a force by which solid particles in the conveyance pipe ascend by rotation of the driving shaft and a force by which the solid particle in the conveyance pipe ascend by a pressure in the layers of the solid particles contained in the fluidized bed reactor is greater than a force by which the solid particles in the conveyance pipe descend by their self-weight.

6. A fluidized bed solid circulation system comprising:
a first fluidized bed reactor comprising a first screw conveyor configured to penetrate through an upper portion of the first fluidized bed reactor and to discharge solid particles to an outside from the first fluidized bed reactor;
a second fluidized bed reactor configured to receive solid particles discharged from the first screw conveyor of the first fluidized bed reactor; and
a connection pipe configured to connect the first and second fluidized bed reactors to each other to allow solid particles discharged from the second fluidized bed reactor to the first fluidized bed reactor,
wherein the first screw conveyor is configured to have an upper end protrude from the upper portion of the first fluidized bed reactor and a lower end located at a height equal to or higher than a height of a distributor of the first fluidized bed reactor.

7. The fluidized bed solid circulation system of claim 6, further comprising at least one of:
a first cyclone configured to receive gas and solid particles discharged from an outlet of the first fluidized bed reactor and separate the gas and the solid particles from each other; and
a second cyclone configured to receive gas and solid particles discharged from an outlet of the second fluidized bed reactor and separate the gas and the solid particles from each other.

8. The fluidized bed solid circulation system of claim 6, further comprising a loop seal interposed between the connection pipes.

9. The fluidized bed solid circulation system of claim 6, further comprising a second screw conveyor disposed between the first screw conveyor of the first fluidized bed reactor and the second fluidized bed reactor,
wherein solid particles discharged from the first screw conveyor are conveyed through the second screw conveyor and then are conveyed to the second fluidized bed reactor.

10. The fluidized bed solid circulation system of claim 9, wherein the second screw conveyor comprises a plurality of sub screw conveyors connected to one another in multi stages,
wherein each of the plurality of sub screw conveyors comprises a solid inlet formed at a lower end of the sub screw conveyor and a solid outlet formed at an upper end of the sub screw conveyor, and
wherein the plurality of sub screw conveyors are arranged so that solid particles discharged from the solid outlet of the first sub screw conveyor flow into the solid inlet of the second sub screw conveyor neighboring with the first sub screw conveyor.

* * * * *